(12) United States Patent
Thurk et al.

(10) Patent No.: US 9,935,495 B2
(45) Date of Patent: Apr. 3, 2018

(54) AUTOMATIC TRANSFER SWITCH

(71) Applicant: Electronic Theatre Controls, Inc., Middleton, WI (US)

(72) Inventors: John Thurk, Fitchburg, WI (US); Kevin Burke, Madison, WI (US)

(73) Assignee: Electronic Theatre Controls, Inc., Middleton, WI (US)

( * ) Notice: Subject to any disclaimer, the term of this patent is extended or adjusted under 35 U.S.C. 154(b) by 173 days.

(21) Appl. No.: 15/191,847

(22) Filed: Jun. 24, 2016

(65) Prior Publication Data

US 2017/0373527 A1    Dec. 28, 2017

(51) Int. Cl.
*H02J 9/06*    (2006.01)

(52) U.S. Cl.
CPC ...................... *H02J 9/06* (2013.01)

(58) Field of Classification Search
CPC ........................................................ H02J 9/06
See application file for complete search history.

(56) References Cited

U.S. PATENT DOCUMENTS

| | | | |
|---|---|---|---|
| 4,910,634 A | 3/1990 | Pipkorn | |
| 5,612,580 A | 3/1997 | Janonis et al. | |
| 5,831,803 A | 11/1998 | Wynn et al. | |
| 6,285,178 B1 | 9/2001 | Ball et al. | |
| 6,518,764 B2 | 2/2003 | Shirato | |
| 6,538,345 B1 | 3/2003 | Maller | |
| 7,208,955 B2 | 4/2007 | Zansky et al. | |
| 7,239,045 B2 | 7/2007 | Lathrop et al. | |
| 7,521,884 B2 | 4/2009 | Filippenko | |
| 7,535,129 B2 | 5/2009 | Phelps et al. | |
| 7,569,949 B2 | 8/2009 | Lathrop et al. | |
| 7,928,604 B2 | 4/2011 | Page | |
| 8,369,060 B2 | 2/2013 | Wodniok | |
| 8,766,489 B2 | 7/2014 | Lathrop | |
| 9,276,408 B2 | 3/2016 | Lathrop et al. | |
| 2008/0088182 A1 | 4/2008 | Lathrop | |
| 2008/0179958 A1 | 7/2008 | Lathrop et al. | |
| 2008/0179967 A1 | 7/2008 | Lathrop et al. | |
| 2009/0015397 A1 | 1/2009 | Eardley et al. | |
| 2014/0203648 A1 | 7/2014 | Siglock et al. | |
| 2015/0214779 A1 | 7/2015 | Tomassi | |

OTHER PUBLICATIONS

Hongfa Miniature High Power Latching Relay HFE10 Datasheet, 2010, pp. 18-23.

*Primary Examiner* — Robert Deberadinis
(74) *Attorney, Agent, or Firm* — Michael Best & Friedrich LLP

(57) ABSTRACT

Automatic transfer switch for switching an electrical load between two power sources. In one example, the automatic transfer switch includes four latching relays and an electronic controller. A first power source line connection is connected to an electrical load line connection via a first latching relay. A first power source neutral connection is connected to an electrical load neutral connection via a second latching relay. A second power source line connection is connected to the electrical load line connection via a third latching relay. A second power source neutral connection is connected to the electrical load neutral connection via a fourth latching relay. The electronic controller connects the second power source to the electrical load when a voltage of the first power source is less than a first threshold, and connects the first power source to the electrical load when the voltage is greater than a second threshold.

19 Claims, 8 Drawing Sheets

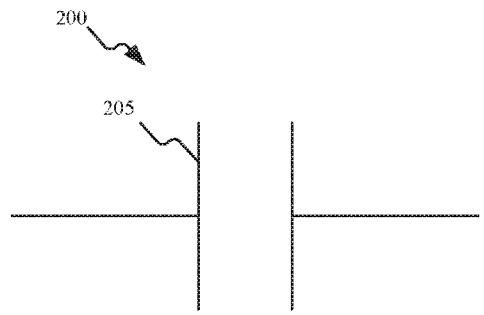
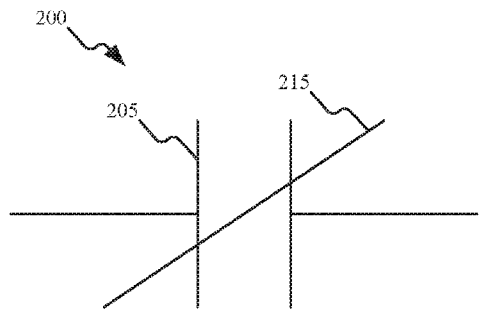
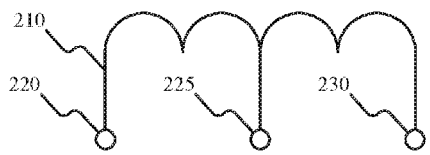
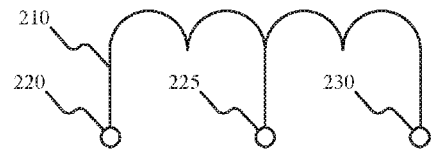
FIG. 2A
FIG. 2B
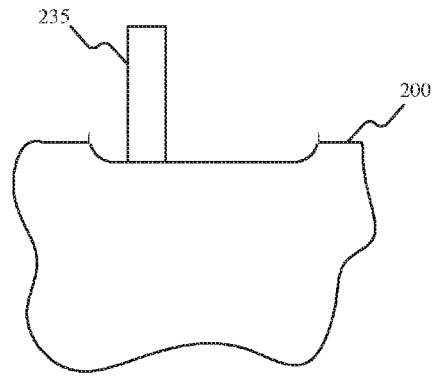
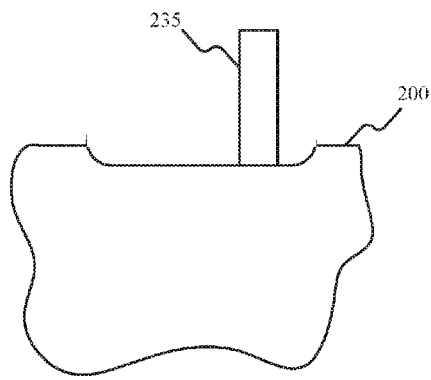
FIG. 3A
FIG. 3B

AUTOMATIC TRANSFER SWITCH

BACKGROUND

The disclosure relates to systems and methods of switching an electrical load (for example, a lighting load) between primary and backup power sources.

Power distribution systems for critical electrical devices (such as emergency lighting) often include a primary power source and a backup power source. These power distribution systems include automatic transfer switches which automatically switch the electrical devices to the backup power source when the primary power source fails. General-purpose automatic transfer switches that are designed to comply with electrical safety standards (such as those typically used for feeder circuits) are large and expensive. Smaller conventional automatic transfer switches (such as those used for branch circuits) often do not comply with current electrical safety standards such as National Fire Protection Association (NFPA) 70, Underwriters Laboratories (UL) 1008, and the like.

SUMMARY

The disclosure provides an automatic transfer switch. In one example, the automatic transfer switch includes a first latching relay, a second latching relay, a third latching relay, a fourth latching relay, and an electronic controller. The first latching relay has an opened state and a closed state. A line connection of a first power source is connected to a line connection of an electrical load via the first latching relay when the first latching relay is in its closed state. The second latching relay has an opened state and a closed state. A neutral connection of the first power source is connected to a neutral connection of the electrical load via the second latching relay when the second latching relay is in its closed state. A third latching relay has an opened state and a closed state. A line connection of a second power source is connected to the line connection of the electrical load via the third latching relay when the third latching relay is in its closed state. The fourth latching relay has an opened state and a closed state. A neutral connection of the second power source is connected to the neutral connection of the electrical load via the fourth latching relay when the fourth latching relay is in its closed state. The electronic controller is electrically coupled to the first latching relay, the second latching relay, the third latching relay, and the fourth latching relay. The electronic controller is configured to determine a voltage of the first power source. The electronic controller is also configured to connect the second power source to the electrical load when the voltage of the first power source is less than a first threshold. The electronic controller is further configured to connect the first power source to the electrical load when the voltage of the first power source is greater than a second threshold.

The disclosure also provides a method of switching an electrical load between a first power source and a second power source. In one example, the method includes determining a voltage of the first power source with an electronic controller. The method also includes opening a first latching relay when the voltage of the first power source is less than a threshold. The first latching relay is connected between a line connection of the first power source and a line connection of the electrical load. The method further includes opening a second latching relay after opening the first latching relay. The second latching relay is connected between a neutral connection of the first power source and a neutral connection of the electrical load. The method also includes closing a fourth latching relay after opening the second latching relay. The fourth latching relay is connected between a neutral connection of the second power source and the neutral connection of the electrical load. The method further includes closing a third latching relay after closing the fourth latching relay. The third latching relay is connected between a line connection of the second power source and the line connection of the electrical load.

The disclosure further provides an automatic transfer switch. In one example, the automatic transfer switch includes a first voltage input, a second voltage input, a third voltage input, a fourth voltage input, a first voltage output, a second voltage output, a first latching relay, a second latching relay, a third latching relay, a fourth latching relay, and an electronic controller. The first voltage input is electrically coupleable to a line connection of a first power source. The second voltage input is electrically coupleable to a neutral connection of the first power source. The third voltage input is electrically coupleable to a line connection of a second power source. The fourth voltage input is electrically coupleable to a neutral connection of the second power source. The first voltage output is electrically coupleable to a line connection of an electrical load. The second voltage output is electrically coupleable to a neutral connection of the electrical load. The first latching relay selectively connects the first voltage input to the first voltage output. The second latching relay selectively connects the second voltage input to the second voltage output. The third latching relay selectively connects the third voltage input to the first voltage output. The fourth latching relay selectively connects the fourth voltage input to the second voltage output. The electronic controller is configured to open and close the first latching relay, the second latching relay, the third latching relay, and the fourth latching relay.

Other aspects of the disclosure will become apparent by consideration of the detailed description and accompanying drawings.

BRIEF DESCRIPTION OF THE DRAWINGS

FIG. 2A is a diagram of a latching relay, capable of being used in the power distribution system of FIG. 1, in an opened state.

FIG. 2B is a diagram of the latching relay included in FIG. 2A in a closed state.

FIG. 3A is a partial exterior view of the latching relay included in FIGS. 2A in an opened state.

FIG. 3B is partial exterior view of the latching relay included in FIG. 2B in a closed state.

DETAILED DESCRIPTION

Figure 1:
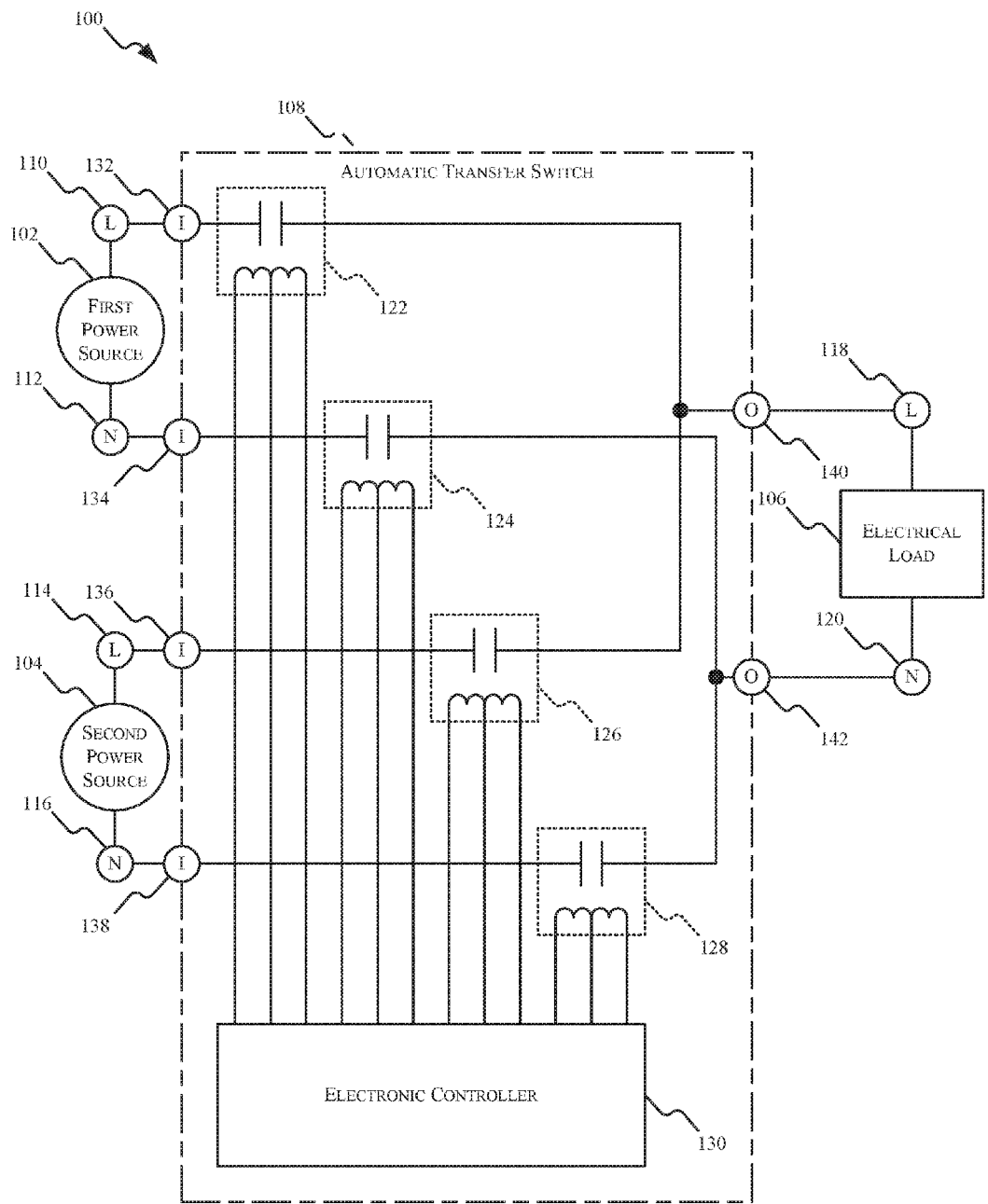
FIG. 1 is a diagram of an exemplary implementation of a power distribution system.

Before any implementations of the disclosure are explained in detail, it is to be understood that the disclosure is not limited in its application to the details of construction and the arrangement of components set forth in the following description or illustrated in the following drawings. The disclosure is capable of other implementations and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using other known means including direct connections, wireless connections, etc.

It should also be noted that a plurality of hardware and software based devices, as well as a plurality of different structural components may be utilized to implement the disclosure. Furthermore, and as described in subsequent paragraphs, the specific configurations illustrated in the drawings are intended to exemplify implementations of the disclosure. Alternative configurations are possible.

The vast majority of automatic transfer switches used for emergency lighting systems fall into two categories. The first category includes switches that are designed to meet Underwriters Laboratories (UL) safety standard UL1008. These switches are large systems that typically include industrial contactors to switch electrical loads between primary and backup power sources. These switches are expensive and are typically designed for feeder-level transfer functions.

The second category includes transfer switches for branch circuits. Conventional branch circuit switches include standard relays (for example, electrically-held relays) to switch electrical loads between primary and backup power sources. While smaller and less expensive than general-purpose transfer switches, conventional branch circuit switches suffer from many shortcomings. Conventional branch circuit switches include designs that do not comply with the UL safety standard UL1008. Conventional branch circuit switches are not capable of handling high inrush current from lighting loads and can often fail due to contact welding at turn on. Further, conventional branch circuit switches employ switching schemes that can cause or allow electrical shorting between the primary power source and the backup power source.

The disclosure described herein relates to systems and methods of switching an electrical load (for example, lighting or emergency lighting) between a primary power source and a secondary (or backup) power source. FIG. 1 is a diagram of one exemplary implementation of a power distribution system 100. The power distribution system 100 illustrated in FIG. 1 includes a first power source 102, a second power source 104, an electrical load 106, and an automatic transfer switch 108.

The first power source 102 includes a line connection 110 and a neutral connection 112. In some implementations, the first power source 102 is a normal power source (for example, utility, primary). In some implementations, the first power source 102 is mains power having nominal line voltages between, for example, 90 Volts and 305 Volts AC and frequencies of approximately 50-60 Hertz (Hz). In some implementations, the voltage of the first power source 102 is equal to the voltage difference between the line connection 110 and the neutral connection 112 of the first power source 102.

The second power source 104 includes a line connection 114 and a neutral connection 116. In some implementations, the second power source 104 is an emergency power source (for example, backup, generator, auxiliary). In some implementations, the second power source 104 has nominal line voltages between, for example, 90 Volts and 305 Volts AC and frequencies of approximately 50-60 Hz. In some implementations, the voltage of the second power source 104 is equal to the voltage difference between the line connection 114 and the neutral connection 116 of the second power source 104.

In some implementations, the electrical load 106 includes, for example, a luminaire, a light fixture, a plurality of light fixtures, lighting, emergency lighting, or any combination thereof. In alternate implementations, the electrical load 106 includes other types of electrical loads. The electrical load 106 includes a line connection 118 and a neutral connection 120. In some implementations, the voltage supplied to the electrical load 106 is equal to the voltage difference between the line connection 118 and the neutral connection 120 of the electrical load 106.

The automatic transfer switch 108 is an electrical device that switches the electrical load 106 between the first power source 102 and the second power source 104. The automatic transfer switch 108 illustrated in FIG. 1 includes a first latching relay 122, a second latching relay 124, a third latching relay 126, a fourth latching relay 128, an electronic controller 130, a first voltage input 132, a second voltage input 134, a third voltage input, 136, a fourth voltage input 138, a first voltage output 140, and a second voltage output 142.

In some implementations, the voltage inputs 132 through 138 include input connectors, and the voltage outputs 140 and 142 include output connectors. The line connection 110 of the first power source 102 is electrically coupled to the first voltage input 132. The neutral connection 112 of the first power source 102 is electrically coupled to the second voltage input 134. The line connection 114 of the second power source 104 is electrically coupled to the third voltage input 136. The neutral connection 116 of the second power source 104 is electrically coupled to the fourth voltage input 138. The line connection 118 of the electrical load 106 is electrically coupled to the first voltage output 140. The neutral connection 120 of the electrical load 106 is electrically coupled to the second voltage output 142.

The first latching relay 122 is connected between the first voltage input 132 and the first voltage output 140 (i.e., between the line connection 110 of the first power source 102 and the line connection 118 of the electrical load 106).

The first latching relay 122 has an opened state and a closed state. When the first latching relay 122 is in its opened state, the line connection 110 of the first power source 102 is disconnected from (i.e., not electrically coupled to) the line connection 118 of the electrical load 106. When the first latching relay 122 is in its closed state, the line connection 110 of the first power source 102 is connected (i.e., electrically coupled) to the line connection 118 of the electrical load 106.

The second latching relay 124 is connected between the second voltage input 134 and the second voltage output 142 (i.e., between the neutral connection 112 of the first power source 102 and the neutral connection 120 of the electrical load 106). The second latching relay 124 has an opened state and a closed state. When the second latching relay 124 is in its opened state, the neutral connection 112 of the first power source 102 is disconnected from (i.e., not electrically coupled to) the neutral connection 120 of the electrical load 106. When the second latching relay 124 is in its closed state, the neutral connection 112 of the first power source 102 is connected (i.e., electrically coupled) to the neutral connection 120 of the electrical load 106.

The third latching relay 126 is connected between the third voltage input 136 and the first voltage output 140 (i.e., between the line connection 114 of the second power source 104 and the line connection 118 of the electrical load 106. The third latching relay 126 has an opened state and a closed state. When the third latching relay 126 is in its opened state, the line connection 114 of the second power source 104 is disconnected from (i.e., not electrically coupled to) the line connection 118 of the electrical load 106. When the third latching relay 126 is in its closed state, the line connection 114 of the second power source 104 is connected (i.e., electrically coupled) to the line connection 118 of the electrical load 106.

The fourth latching relay 128 is connected between the fourth voltage input 138 and the second voltage output 142 (i.e., between the neutral connection 116 of the second power source 104 and the neutral connection 120 of the electrical load 106). The fourth latching relay 128 has an opened state and a closed state. When the fourth latching relay 128 is in its opened state, the neutral connection 116 of the second power source 104 is disconnected from (i.e., not electrically coupled to) the neutral connection 120 of the electrical load 106. When the fourth latching relay 128 is in its closed state, the neutral connection 116 of the second power source 104 is connected (i.e., electrically coupled) to the neutral connection 120 of the electrical load 106.

FIGS. 2A and 2B are diagrams of one exemplary implementation of a latching relay 200 in the opened state and in the closed state, respectively. Unlike electrically-held relays which require a constant current supply to hold their positions, the latching relay 200 remains in its opened state or closed state without a holding current being supplied to the latching relay 200. In some implementations, the latching relay 200 includes a 2 coils latching, 1 Form A (1A) latching relay. In some implementations, the latching relay 200 includes a miniature high power latching relay (for example, the HFE10 miniature high power latching relay from Honga™). In the implementation illustrated in FIGS. 2A and 2B, the latching relay 200 includes a relay 205, a coil 210, and a contact 215. The latching relay 200 is in its opened state when the contact 215 is open (illustrated in FIG. 2A) and in its closed state when the contact 215 is closed (illustrated in FIG. 2B). The coil 210 includes a first coil that is energized to close the contact 215 of the latching relay 200 and a second coil that is energized to open the contact 215 of the latching relay 200. The coil 210 also includes a plurality of terminals 220, 225, 230. The electronic controller 130 selectively provides electrical signals between different combinations of the plurality of terminals 220, 225, 230 to energize the two coils. As an example, in some implementations, the electronic controller 130 sends an electrical signal between terminal 225 and terminal 220 to open the contact 215 and sends an electrical signal between terminal 225 and terminal 230 to close the contact 215.

FIGS. 3A and 3B are partial exterior views of one exemplary implementation of the latching relay 200 in the opened state and in the closed state, respectively. In the implementation illustrated in FIGS. 3A and 3B, the latching relay 200 includes a lever 235 that is mechanically connected to the contact 215 of the latching relay 200 such that movement of the contact 215 causes movement of the lever 235. In some implementations, the lever 235 is part of a manual switch included in the latching relay 200. When the contact 215 is opened (i.e., the latching relay 200 is in the opened state (FIG. 2A)), the lever 235 is positioned at a first location, as illustrated in FIG. 3A. Alternatively, when the contact 215 is closed (i.e., the latching relay 200 is in the closed state (FIG. 2B)), the lever 235 is positioned at a second location, as illustrated in FIG. 3B.

Figure 4:
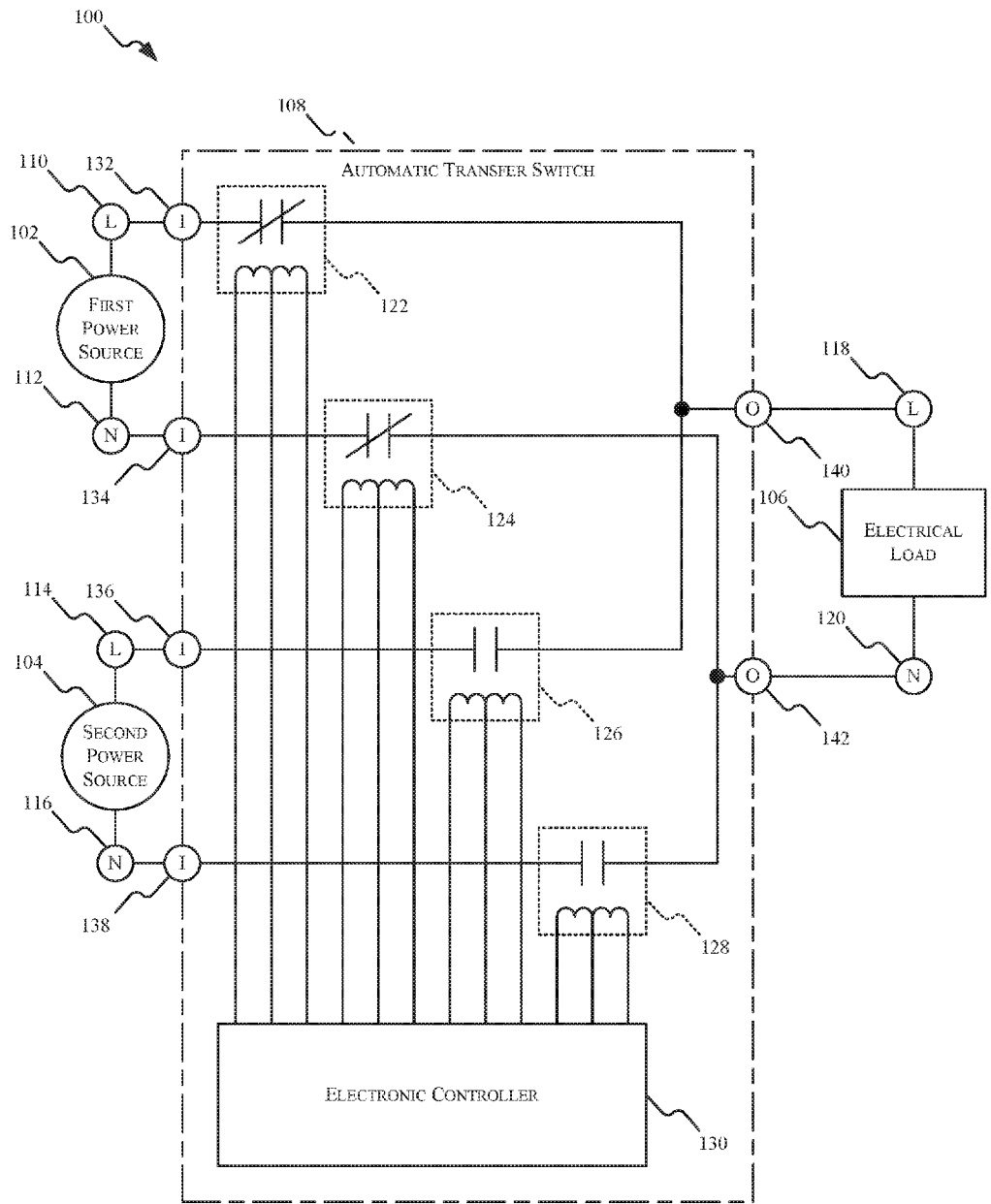
FIG. 4 is a diagram of the power distribution system included in FIG. 1 when a first power source is connected to an electrical load.

The automatic transfer switch 108 has a first state (for example, a non-transferred state, a normal state, a default state) and a second state (for example, a transferred state, an emergency state). Referring to FIG. 4, when the automatic transfer switch 108 is in the non-transferred state, the coils of the first latching relay 122 and the second latching relay 124 are de-energized and the contacts of the first latching relay 122 and the second latching relay 124 are initially closed (the "closed state") to connect (i.e., electrically couple) the first power source 102 to the electrical load 106. The coils of the third latching relay 126 and the fourth latching relay 128 are de-energized and the contacts of the third latching relay 126 and the fourth latching relay 128 are initially opened (the "opened state") such that the second power source 104 is disconnected from (i.e., not electrically coupled to) the electrical load 106.

Figure 5:
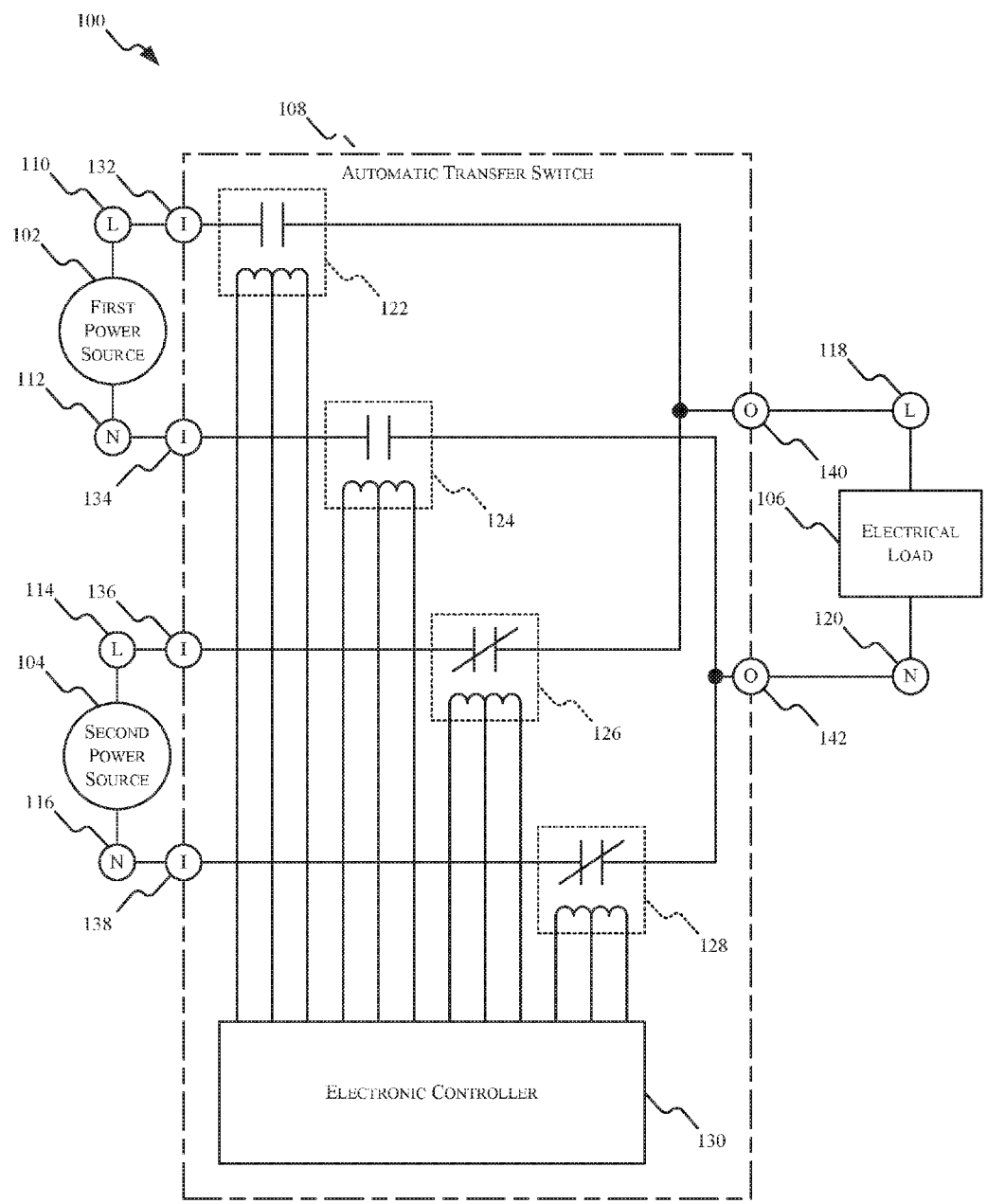
FIG. 5 is a diagram of the power distribution system included in FIG. 1 when a second power source is connected to the electrical load.

Referring to FIG. 5, when a transfer operation to the transferred state is commanded, as will be described below in more detail, the coils of the first latching relay 122 and the second latching relay 124 are energized to open the contacts of the first latching relay 122 and the second latching relay 124 to disconnect the first power source 102 from the electrical load 106. Next, the coils of the third latching relay 126 and the fourth latching relay 128 are energized to close the contacts of the third latching relay 126 and the fourth latching relay 128 to connect the second power source 104 to the electrical load 106.

Figure 6:
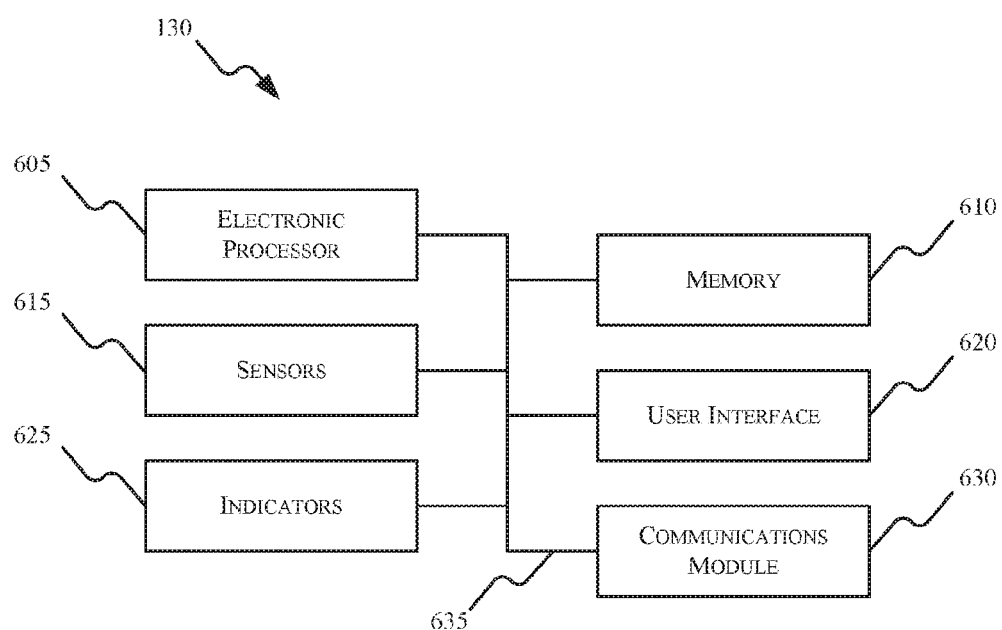
FIG. 6 is a diagram of an exemplary implementation of an electronic controller included in the power distribution system of FIG. 1.

FIG. 6 is a diagram of one exemplary implementation of the electronic controller 130. In the implementation illustrated, the electronic controller 130 includes an electronic processor 605 (for example, a microprocessor or microcontroller), memory 610, sensors 615, a user interface 620, one or more indicators 625, and a communication module 630. The electronic processor 605, the memory 610, the sensors 615, the user interface 620, the indicators 625, and the communication module 630 are connected to each other by one or more control or data buses 635, or a combination thereof. In alternate implementations, the electronic controller 130 may include fewer or additional components in configurations different from the configuration illustrated in FIG. 6.

In some implementations, the electronic controller 130 includes a plurality of additional passive and active components such as resistors, capacitors, inductors, integrated circuits, amplifiers, or any combination thereof. These components are arranged and connected to provide a plurality of electrical functions to the automatic transfer switch 108 including filtering, signal conditioning, voltage regulation, or any combination thereof. For descriptive purposes, the electronic controller 130 and the electrical components populated on the electronic controller 130 are collectively referred to as the electronic controller 130.

The memory 610 may include read-only memory (ROM), random access memory (RAM), other non-transitory computer-readable media, or a combination thereof. The electronic processor 605 is configured to retrieve instructions and data from the memory 610 and execute, among other things, instructions to perform the methods described herein.

The sensors 615 are operably coupled to the electronic processor 605 to determine, for example, the voltages supplied by the first power source 102 and the second power source 104. In some implementations, the sensors 615 include voltage sensors configured to determine, for example, the voltage difference between the line connection 110 and the neutral connection 112 of the first power source 102. In alternative implementations, the sensors 615 include current sensors configured to determine, for example, the current supplied by the first power source 102 on the line connection 110.

In some implementations, the sensors 615 also determine the positions of the latching relays 122 through 128. In other words, the sensors 615 determine whether each of the latching relays 122 through 128 are in the opened state or in the closed state. In some implementations, the sensors 615 include at least one optical sensor for each of the latching relays 122 through 128. In alternate implementations, the sensors 615 may include other sensors to determine the positions of the latching relays 122 through 128, such as, Hall Effect sensors, micro switch sensors, and electrical feedback sensors. In some implementations, the all or a portion of the sensors 615 are separated from the electronic controller 130.

The user interface 620 is included to control the automatic transfer switch 108 or the operation of the power distribution system 100 as a whole. The user interface 620 is operably coupled to the electronic processor 605 to control, for example, when the automatic transfer switch 108 is in the non-transferred state or in the transferred state. The user interface 620 can include any combination of digital and analog input devices required to achieve a desired level of control for the system. For example, the user interface 620 may include a computer having a display and input devices, a touch-screen display, a plurality of knobs, dials, switches, buttons, faders, or the like. In some implementations, the user interface 620 is separated from the electronic controller 130 or the automatic transfer switch 108.

The one or more indicators 625 (for example, light emitting diodes (LEDs) or a liquid crystal display (LCD)) indicate various statuses of the automatic transfer switch 108. As an example, a first indicator may indicate when the automatic transfer switch 108 is in the non-transferred state and a second indicator may indicate when the automatic transfer switch 108 is in the transferred state.

The communication module 630 sends and/or receives signals to and/or from one or more separate communication modules. Signals may include, for example, information, data, serial data, data packets, analog, and fire alarm signals. The communication module 630 can be coupled to one or more separate communication modules via wires, fiber, and/or a wirelessly. Communication via wires and/or fiber can be any appropriate network topology known to those skilled in the art, such as Ethernet. Wireless communication can be any appropriate wireless network topology known to those skilled in the art, such as Wi-Fi, ZigBee®, Bluetooth®, and the like.

Figure 7:
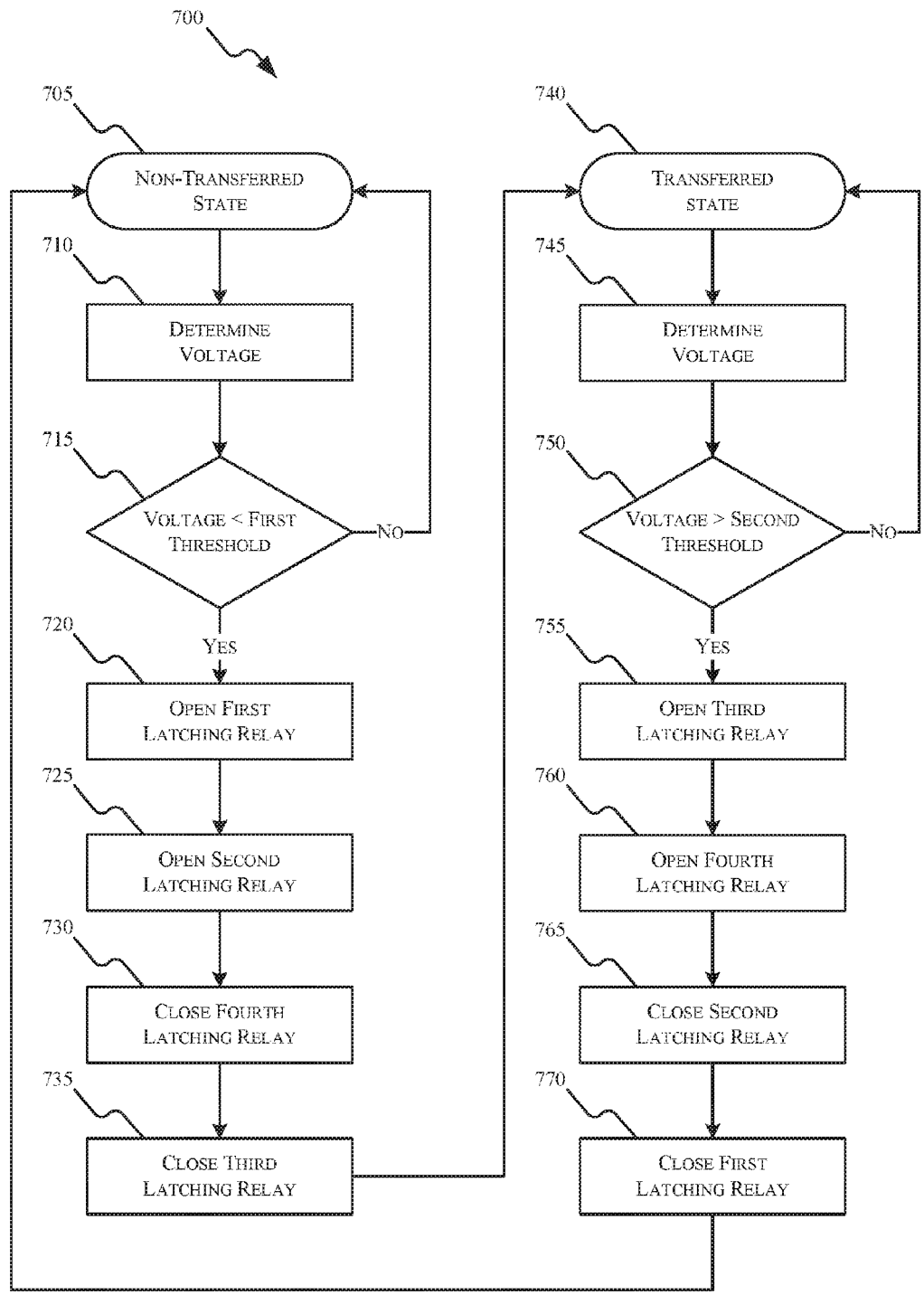
FIG. 7 is a flowchart of a method of selectively connecting either the first power source or the second power source to the electrical load in the power distribution system of FIG. 1.

The automatic transfer switch 108 determines when to place the automatic transfer switch 108 in the non-transferred state and in the transferred state based in part on the voltage of the first power source 102. In some implementations, the electronic controller 130, or more particularly, the electronic processor 605 executing instructions, performs or causes the automatic transfer switch 108 to perform the method 700 illustrated in FIG. 7 to selectively connect either the first power source 102 or the second power source 104 to the electrical load 106. The method 700 is described in terms of the power distribution system 100 illustrated in FIG. 1 to provide one example. The method 700 may be applied to other power distribution systems and is not limited to the power distribution system 100 illustrated in FIG. 1.

In the implementation illustrated, the method 700 includes the automatic transfer switch 108 being in the non-transferred state (at block 705). As described above, the first power source 102 is connected (i.e., electrically coupled) to the electrical load 106 and the second power source 104 is disconnected from (i.e., not electrically coupled to) the electrical load 106 when the automatic transfer switch 108 is in the non-transferred state.

The electronic controller 130 determines a voltage of the first power source 102 (at block 710). In some implementations, the electronic controller 130 determines the voltage of the first power source 102 based on a voltage difference between the line connection 110 and the neutral connection 112 of the first power source 102. In some implementations, the electronic controller 130 also determines a voltage of the second power source 104.

The electronic controller 130 compares the voltage of the first power source 102 with a threshold (for example, a first threshold) (at block 715). In some implementations, the first threshold is a minimum voltage required to provide adequate power to the electrical load 106. As an example, when the first power source 102 is configured to supply a nominal line voltage of approximately 110 Volts AC, the first threshold may be set at 90 Volts. If the voltage of the first power source 102 is greater than the first threshold, the electronic controller 130 determines that the first power source 102 is supplying adequate power to the electrical load 106 and the automatic transfer switch 108 should stay in the non-transferred state. On the other hand, if the voltage of the first power source 102 falls below the first threshold, the electronic controller 130 determines that power supplied by the first power source 102 is insufficient for the electrical load 106 and the automatic transfer switch 108 should be placed in the transferred state. In some implementations, the electronic controller 130 determines that the automatic transfer switch 108 should be placed in the transferred state when the voltage of the first power source 102 is less than the first threshold for longer than a defined continuous period of time (for example, one second). In some implementations, the electronic controller 130 determines if a voltage of the second power source 104 is present and adequate (for example, greater than a threshold) before placing the automatic transfer switch 108 in the transferred state.

To place the automatic transfer switch 108 in the transferred state, the electronic controller 130 starts by disconnecting the first power source 102 from the electrical load 106. In the example illustrated, the electronic controller 130 first opens the first latching relay 122 (at block 720) and then opens the second latching relay 124 (at block 725) to disconnect the first power source 102 from the electrical load 106.

The electronic controller 130 connects the second power source 104 to the electrical load 106 after disconnected the first power source 102 from the electrical load 106. In the example illustrated, the electronic controller 130 first closes the fourth latching relay 128 (at block 730) and then closes the third latching relay 126 (at block 735) to place the automatic transfer switch 108 in the transferred state (at block 740).

While the automatic transfer switch 108 is in the transferred state, the electronic controller 130 determines a voltage of the first power source 102 (at block 745). The electronic controller 130 compares the voltage of the first power source 102 with a threshold (for example, a second threshold) (at block 750). In some implementations, the second threshold is equal to the first threshold. In alternate implementations, the second threshold is not equal to the first threshold (for example, greater than or less than). As an example, the first threshold may be set to 85 Volts and the second threshold may be set to 90 Volts. If the voltage of the first power source 102 is less than the second threshold, the electronic controller 130 determines that the first power source 102 cannot supply adequate power to the electrical load 106 and the automatic transfer switch 108 should stay in the transferred state. On the other hand, if the voltage of the first power source 102 rises above the second threshold, the electronic controller 130 determines that power supplied by the first power source 102 is sufficient for the electrical load 106 and automatic transfer switch 108 should be placed in the non-transferred state. In some implementations, the electronic controller 130 determines that the automatic transfer switch 108 should be placed in the non-transferred state when the voltage of the first power source 102 is greater than the second threshold for longer than a defined period of time (for example, one second).

To place the automatic transfer switch 108 in the non-transferred state, the electronic controller 130 starts by disconnecting the second power source 104 from the electrical load 106. In the example illustrated, the electronic controller 130 first opens the third latching relay 126 (at block 755) and then opens the fourth latching relay 128 (at block 760) to disconnect the second power source 104 from the electrical load 106.

The first power source 102 is connected to the electrical load 106 after the second power source 104 is disconnected from the electrical load 106. In the example illustrated, the electronic controller 130 first closes the second latching relay 124 (at block 765) and then closes the first latching relay 122 (at block 770) to place the automatic transfer switch 108 in the non-transferred state (at block 705).

Figure 8:
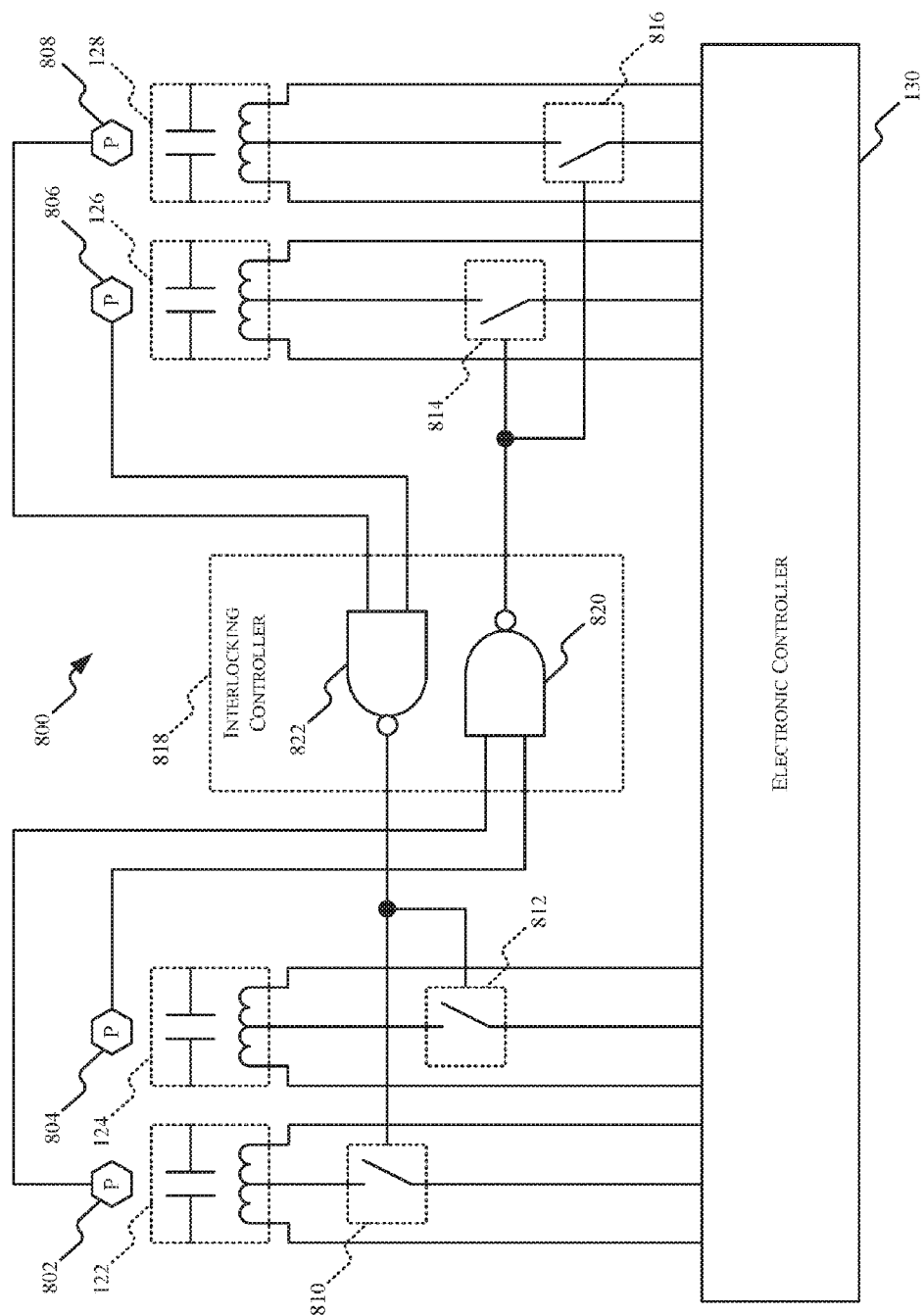
FIG. 8 is a diagram of an exemplary implementation of an interlocking circuit for the automatic transfer switch included in FIG. 1.

In some implementations, the automatic transfer switch 108 includes an interlocking circuit 800 which prevents simultaneous connection of the first power source 102 and the second power source 104 to the electrical load 106. FIG. 8 is a diagram of one exemplary implementation of the interlocking circuit 800. The connections between the latching relays 122 through 128, the first power source 102, the second power source 104, and the electrical load 106 are omitted from FIG. 8 for illustrative purposes. In the implementation illustrated, the interlocking circuit 800 includes a plurality of position sensors 802 through 808, a plurality of electrical switches 810 through 816, and an interlocking controller 818. In some implementations, as illustrated in FIG. 8, the interlocking circuit 800 is separate from the electronic controller 130. In alternate implementations, the interlocking circuit 800 is included in the electronic controller 130. In some implementations, the interlocking circuit 800 is a hardware-only electrical interlock which performs interlocking functions without any interaction with any form of software. As an example, in some implementations, the operation of the interlocking circuit 800 is unaffected by any software running in the electronic controller 130. In other words, the electronic controller 130 and the interlocking circuit 800 operate independent of one another. Separate, hardware-only electrical implementations of interlocking functions (such as the example illustrated in FIG. 8) are reliable and can avoid intense compliance testing required for software-based interlocking functions.

The plurality of position sensors 802 through 808 are configured to detect the positions (for example, opened and closed) of the latching relays 122 through 128. As an example, position sensor 802 detects the position of the first latching relay 122. In some implementations, the plurality of position sensors 802 through 808 includes optical sensors. In alternate implementations, the plurality of position sensors 802 through 808 may include other types of sensors to determine the positions of the latching relays 122 through 128, such as, Hall Effect sensors, micro switch sensors, and electrical feedback sensors.

Figure 9A:
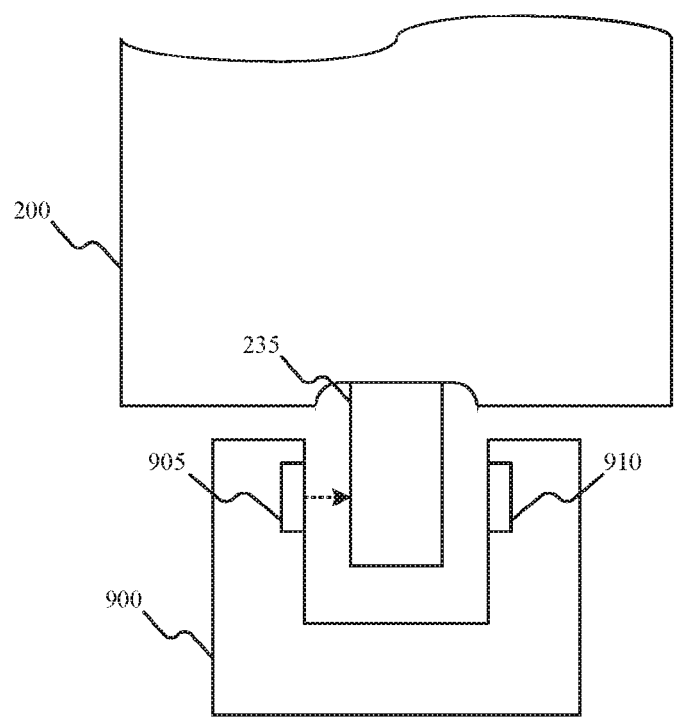
FIG. 9A is a diagram of an exemplary implementation of an optical sensor and the latching relay included in FIG. 3A in an opened state.
Figure 9B:
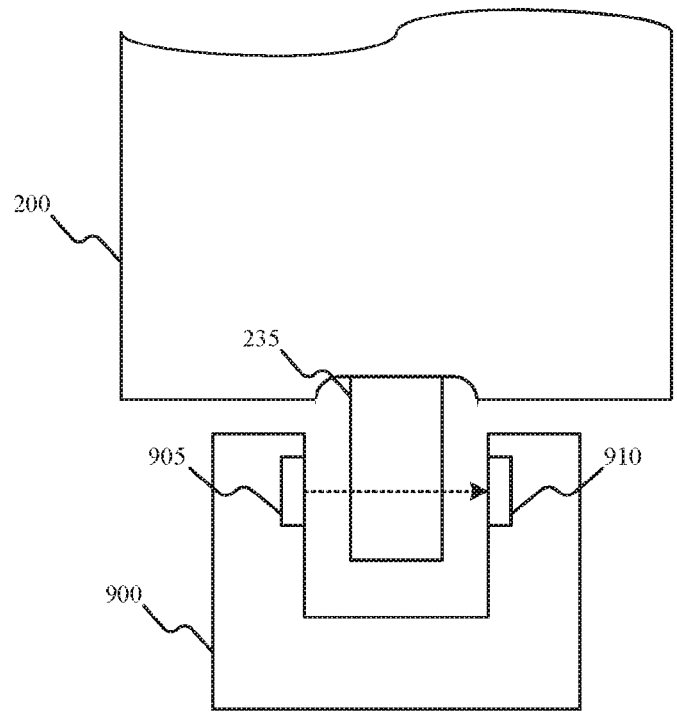
FIG. 9B is a diagram of the optical sensor included in FIG. 9A and the latching relay included in FIG. 3B in a closed state.

FIGS. 9A and 9B are diagrams of one exemplary implementation of an optical sensor 900 and the latching relay 200 (illustrated in FIGS. 2A and 2B). The optical sensor 900 includes a light emitting device 905 (for example, a light emitting diode (LED)) and a light detection device 910 (for example, a phototransistor, a photodiode, and the like). The optical sensor 900 is positioned relative to the latching relay 200 (for example, next to the latching relay 200) such that the lever 235 is selectively positioned between the light emission device 905 and the light detection device 910 based on the position of the contact 235 in the latching relay 200. When the latching relay 200 is in the opened state, the lever 905 is positioned such that it intercepts the output (emitted light) from the light emission device 905 to prevent it from being irradiated on the light detection device 910, as illustrated in FIG. 9A. Alternatively, when the latching relay 200 is in the closed state, the lever 235 is positioned such that it does not intercept the output from the light emission device 905, as illustrated in FIG. 9B.

Returning to FIG. 8, the plurality of electrical switches 810 through 816 are configured to selectively prevent the electronic controller 130 from sending control signals to the state of the latching relays 122 through 128. As an example, electrical switch 810 is connected between the electronic controller 130 and the first latching relay 122. When electrical switch 810 is opened, a connection between the electronic controller 130 and the first latching relay 122 is broken and the electronic controller 130 is unable to change the state of the first latching relay 122. When electrical switch 810 is closed, the connection between the electronic controller 130 and the first latching relay 122 is complete and the electronic controller 130 is able to selectively change the state of the first latching relay 122. In some implementations, the plurality of electrical switches 810 through 816 includes transistors (for example, bipolar junction transistors (BJTs) and field effect transistors (FETs)). In some implementations, electrical switches 810 and 812 are replaced by a single electrical switch, and electrical switches 814 and 816 are replaced by a single electrical switch.

The interlocking controller 818 connects the plurality of position sensors 802 through 808 to the plurality of electrical switches 810 through 816 in a configuration that prevents the electronic controller 130 from simultaneously connecting the first power source 102 and the second power source 104 to the electrical load 106. This configuration also prevents the electronic controller 130 from transferring the automatic transfer switch 108 between the non-transferred and transferred states in the event of a welded relay contact. In the implementation illustrated in FIG. 8, the interlocking controller 818 includes a first NAND gate 820 and a second NAND gate 822. In alternate implementations, the interlocking controller 818 includes other logic-based elements. In some implementations, the interlocking controller 818 may include the components or a subset of the components included in the electronic controller 130.

Position sensors 802 and 804 are electrically coupled to an input of the first NAND gate 820. An output of the first NAND gate 820 is electrically coupled to electrical switches 814 and 816. When both the first latching relay 122 and the second latching relay 124 are in the opened position, the first NAND gate 820 generates an output signal which causes electrical switches 814 and 816 to close. Otherwise, when either the first latching relay 122 or the second latching relay 124 is in the closed position, the first NAND gate 820 does not generate the output signal and electrical switches 814 and 816 are opened. Similarly, position sensors 806 and 808 are electrically coupled to an input of the second NAND gate 822. An output of the second NAND gate 822 is electrically coupled to electrical switches 810 and 812. When both the third latching relay 126 and the fourth latching relay 128 are in the opened position, the second NAND gate 822 generates an output signal which causes electrical switches 810 and 812 to close. Otherwise, when either the third latching relay 126 or the fourth latching relay 128 is in the closed position, the second NAND gate 822 does not generate the output signal and electrical switches 810 and 812 are opened.

As explained above, in some implementations, the electronic controller 130 determines a voltage of the first power source 102 based on a voltage difference between the line connection 110 and the neutral connection 112 of the first power source 102. However, the difference between the line connection 110 and the neutral connection 112 of the first power source 102 may not represent the current maximum voltage potential that the first power source 102 is capable of supplying. As an example, when the first power source 102 includes a dimmer circuit, the voltage on the line connection 110 of the first power source 102 may represent the current output of the dimmer circuit, as opposed to the current maximum voltage potential that the first power source 102 is capable of providing. Therefore, in some implementations, the electronic controller 130 determines the voltage of the first power source 102 based on a voltage difference between the neutral connection 112 of the first power source 102 and a separate sense connection of the first power source 102. As an example, in addition to a line connection 110 representing the output of the dimmer, the first power source 102 may also include a sense connection representing the current maximum voltage potential that the first power source 102 is capable of supplying.

In some implementations, the automatic transfer switch 108 includes a light sensor configured to detect a specific wavelength or a specific range of wavelengths of light (for example, red laser light). In some implementations, the electronic controller 130 is configured to switch the automatic transfer switch 108 from the non-transferred state to the transferred state for a predetermined period of time when the light sensor detects light (for example, five seconds). After the predetermined period of time elapses, the electronic controller 130 switches the automatic transfer switch 108 back into the non-transferred state. This feature may be used to initiate testing of the automatic transfer switch 108, for example, when it is positioned in a remote location.

In some implementations, the automatic transfer switch 108 includes a manually-operable switch (for example, a pushbutton switch, a toggle switch, and the like). In some implementations, the electronic controller 130 is configured to switch the automatic transfer switch 108 from the non-transferred state to the transferred state for a period of time when the manually-operable switch is operated (for example, when the manually-operable switch is pressed). When the manually-operable switch is released, the electronic controller 130 switches the automatic transfer switch 108 back into the non-transferred state. This feature can be used to initiate testing of the automatic transfer switch 108.

In some implementations, the automatic transfer switch 108 changes from the non-transferred state to the transferred state based on signals received via the communication module 630. As an example, in some implementations, the automatic transfer switch 108 changes into the transferred state when the electronic controller 130 receives a fire alarm signal via the communication module 630.

Thus, the disclosure provides an automatic transfer switch 108 and method for switching an electrical load 106 between multiple power supplies. Various features and advantages of the disclosure are set forth in the following claims.

What is claimed is:

1. An automatic transfer switch comprising:
a first latching relay having an opened state and a closed state, wherein a line connection of a first power source is connected to a line connection of an electrical load via the first latching relay when the first latching relay is in its closed state;
a second latching relay having an opened state and a closed state, wherein a neutral connection of the first power source is connected to a neutral connection of the electrical load via the second latching relay when the second latching relay is in its closed state;
a third latching relay having an opened state and a closed state, wherein a line connection of a second power source is connected to the line connection of the electrical load via the third latching relay when the third latching relay is in its closed state;
a fourth latching relay having an opened state and a closed state, wherein a neutral connection of the second power source is connected to the neutral connection of the electrical load via the fourth latching relay when the fourth latching relay is in its closed state; and
an electronic controller electrically coupled to the first latching relay, the second latching relay, the third latching relay, and the fourth latching relay, the electronic controller configured to
determine a voltage of the first power source,
connect the second power source to the electrical load when the voltage of the first power source is less than a first threshold, and
connect the first power source to the electrical load when the voltage of the first power source is greater than a second threshold.

2. The automatic transfer switch of claim 1, wherein the first latching relay is latched in either the opened state or the closed state without a holding current supplied to the first latching relay.

3. The automatic transfer switch of claim 1, wherein the second threshold is greater than the first threshold.

4. The automatic transfer switch of claim 1, wherein the first latching relay and the second latching relay are in their closed state when the first power source is electrically coupled to the electrical load, and wherein the third latching relay and the fourth latching relay are in their closed state when the second power source is electrically coupled to the electrical load.

5. The automatic transfer switch of claim 4, wherein the electronic controller is further configured to
  disconnect the second power source from the electrical load when the voltage of the first power source is greater than the second threshold, and
  disconnect the first power source from the electrical load when the voltage of the first power source is less than the first threshold.

6. The automatic transfer switch of claim 5, wherein the first latching relay and the second latching relay are in their opened state when the first power source is disconnected from the electrical load, wherein the third latching relay and the fourth latching relay are in their opened state when the second power source is disconnected from the electrical load.

7. The automatic transfer switch of claim 1, further comprising an optical sensor electrically coupled to the electronic controller, wherein the electronic controller is further configured to
  receive a signal from the optical sensor, and
  responsive to receiving the signal:
    disconnect the first power source from the electrical load, and
    connect the second power source to the electrical load.

8. The automatic transfer switch of claim 1, further comprising an interlocking circuit including:
  a plurality of position sensors configured to detect positions of the first latching relay, the second latching relay, the third latching relay, and the fourth latching relay,
  a plurality of electrical switches positioned between the electronic controller, the first latching relay, the second latching relay, the third latching relay, and the fourth latching relay, and
  an interlocking controller electrically coupled to the plurality of position sensors and the plurality of electrical switches, the interlocking controller configured to selectively open and close the plurality of electrical switches based on the positions detected by the plurality of position sensors.

9. The automatic transfer switch of claim 8, wherein the plurality of position sensors includes at least one type of sensor selected from a group consisting of an optical sensor, a hall effect sensor, a micro switch sensor, and an electrical feedback sensor.

10. The automatic transfer switch of claim 9, wherein the third latching relay and the fourth latching relay are their opened state when at least one of the first latching relay and the second latching relay is in the closed state, wherein the first latching relay and the second latching relay are their opened state when at least one of the third latching relay and the fourth latching relay is in the closed state.

11. The automatic transfer switch of claim 1, wherein the voltage of the first power source includes a voltage difference between the line connection of the first power source and the neutral connection of the first power source.

12. A method of switching an electrical load between a first power source and a second power source, the method comprising:
  determining, with an electronic controller, a voltage of the first power source;
  opening a first latching relay when the voltage of the first power source is less than a threshold, the first latching relay connected between a line connection of the first power source and a line connection of the electrical load;
  opening a second latching relay after opening the first latching relay, the second latching relay connected between a neutral connection of the first power source and a neutral connection of the electrical load;
  closing a fourth latching relay after opening the second latching relay, the fourth latching relay connected between a neutral connection of the second power source and the neutral connection of the electrical load; and
  closing a third latching relay after closing the fourth latching relay, the third latching relay connected between a line connection of the second power source and the line connection of the electrical load.

13. The method of claim 12, wherein the threshold is a first threshold, wherein the method further comprising:
  opening the third latching relay when the voltage of the first power source is greater than a second threshold;
  opening the fourth latching relay after opening the third latching relay;
  closing the second latching relay after opening the fourth latching relay; and
  closing the first latching relay after closing the second latching relay.

14. The method of claim 13, wherein the second threshold is greater than the first threshold.

15. The method of claim 12, further comprising:
  detecting, via an optical sensor, an optical signal;
  disconnecting, via the first latching relay and the second latching relay, the first power source from the electrical load in response to detecting the optical signal; and
  connecting, via the third latching relay and the fourth latching relay, the second power source to the electrical load.

16. The method of claim 12, further comprising:
  receiving, via an communication module, a signal; and
  disconnecting, via the first latching relay and the second latching relay, the first power source from the electrical load in response to receiving the signal; and
  connecting, via the third latching relay and the fourth latching relay, the second power source to the electrical load.

17. The method of claim 12, wherein the voltage of the first power source includes a voltage difference between the line connection of the first power source and the neutral connection of the first power source.

18. An automatic transfer switch comprising:
  a first voltage input electrically coupleable to a line connection of a first power source;
  a second voltage input electrically coupleable to a neutral connection of the first power source;
  a third voltage input electrically coupleable to a line connection of a second power source;
  a fourth voltage input electrically coupleable to a neutral connection of the second power source;
  a first voltage output electrically coupleable to a line connection of an electrical load;
  a second voltage output electrically coupleable to a neutral connection of the electrical load;
  a first latching relay selectively connecting the first voltage input to the first voltage output;
  a second latching relay selectively connecting the second voltage input to the second voltage output;

a third latching relay selectively connecting the third voltage input to the first voltage output;

a fourth latching relay selectively connecting the fourth voltage input to the second voltage output; and an electronic controller configured to open and close the first latching relay, the second latching relay, the third latching relay, and the fourth latching relay.

19. The automatic transfer switch of claim 18, wherein the electronic controller is further configured to determine a voltage difference between the first voltage input and the second voltage input, open the first latching relay and the third latching relay when the voltage difference is less than a threshold, close the third latching relay and the fourth latching relay when the voltage difference is less than the threshold, close the first latching relay and the second latching relay when the voltage difference is greater than the threshold, and open the third latching relay and the fourth latching relay when the voltage difference is greater than the threshold.

\* \* \* \* \*